United States Patent [19]

Germer

[11] Patent Number: 4,769,208
[45] Date of Patent: Sep. 6, 1988

[54] AUTOMATIC SAFETY ROD FOR REACTORS

[75] Inventor: John H. Germer, San Jose, Calif.

[73] Assignee: The United States of America as represented by the United States Department of Energy, Washington, D.C.

[21] Appl. No.: 360,965

[22] Filed: Mar. 23, 1982

[51] Int. Cl.$^4$ ............................................. G21C 7/00
[52] U.S. Cl. .................................. 376/336; 376/230; 376/242; 376/203
[58] Field of Search ............... 376/230, 231, 336, 337, 376/242, 203

[56] References Cited

U.S. PATENT DOCUMENTS

| | | |
|---|---|---|
| 2,353,093 | 7/1944 | Tryon . |
| 3,115,453 | 12/1963 | Paget et al. . |
| 3,462,345 | 8/1969 | Jabsen ................................ 376/230 |
| 3,557,812 | 1/1971 | Stedfeld . |
| 3,573,166 | 3/1971 | Germer ............................. 376/230 |
| 3,940,310 | 2/1976 | Irion et al. . |
| 3,980,519 | 9/1976 | Taft . |
| 4,158,602 | 6/1979 | Minnick ............................ 376/230 |
| 4,167,443 | 9/1979 | Noyes et al. . |

OTHER PUBLICATIONS

EPRI NP-846, Aug. 1978, pp. iii, iv, v, xiii, 1-1, 1-2, 1-3, 1-4, (3-1)-(3-51).
XL-895-00453, Sep. 1980, Germer et al., pp. 2-22, (A-1)-(A-10).

Primary Examiner—Harvey E. Behrend
Attorney, Agent, or Firm—L. E. Carnahan; Roger S. Gaither; Judson R. Hightower

[57] ABSTRACT

An automatic safety rod for a nuclear reactor containing neutron absorbing material and designed to be inserted into a reactor core after a loss-of-core flow. Actuation is based upon either a sudden decrease in core pressure drop or the pressure drop decreases below a predetermined minimum value. The automatic control rod includes a pressure regulating device whereby a controlled decrease in operating pressure due to reduced coolant flow does not cause the rod to drop into the core.

12 Claims, 3 Drawing Sheets

AUTOMATIC SAFETY ROD FOR REACTORS

The invention described herein arose in the course of, or under Contract No. DE-AT03-76SF71032 between the U.S. Department of Energy and the General Electric Company.

BACKGROUND OF THE INVENTION

The invention relates to automatic shut-down systems for nuclear reactors, and more particularly to an automatic safety rod for such shutdown systems which includes a pressure regulating device to prevent undesired shutdown due to a decrease of coolant flow.

The use of control systems to regulate the reactivity of a nuclear reactor by varying the location of control (neutron absorber) elements with respect to the reactor core is well known. With a view toward the possibility of an emergency condition arising, as by an unexpected drop in coolant flow or rise in reactivity, such control systems include arrangements for "scramming" the control rods; i.e., for rapid insert of the absorber elements into the core to quickly shut down the reactor.

With the advent of the liquid metal fast breeder reactor (LMFBR), a need for faster, less complex, more reliable control rod scram or shutdown systems has become apparent, whereby the reactivity of the reactor can be quickly shut down.

More recent efforts have been directed to the desirability of utilizing secondary or alternate control systems of the self-actuating type which would make a liquid metal fast breeder reactor (LMFBR) inherently safe. Such alternate or self-actuating systems provide control without reliance on the primary reactor control system or plant operators, while being capable of actuation by the plant operators. These efforts have resulted in systems which sense the reactor flow rate and actuate when the flow drops below a predetermined level, or sense the coolant temperature and actuate when it exceeds a certain level, or measure the neutron flux or reactivity level of the reactor and actuate when the neutron flux or reactivity exceeds a specified level.

Also, recent efforts have been directed to utilizing a self activated shutdown system (SASS) in a gas-cooled fast reactor (GCFR), wherein the lower core pressure drop imposes a more severe limitation on the operation capability at partial flow. The SASS for the GCFR, like the LMFBR, usually requires a built-in energy absorbing dashpot to prevent damage to the falling control rod.

One general type of shutdown system utilizes control rods held in the uppermost, or cocked, position hydrostatically by the differential fluid pressure across the reactor core. If this pressure decreases below a design lower limit, the control rod will fall by gravity into the reactor core and stop the chain reaction. Resetting of the rods is accomplished only by deliberately lowering a lifting grapple to engage the control rod and return it to the uppermost or cocked position while the coolant is pumped through the core. The grapple is then disengaged and retracted.

These prior known hydrostatic or coolant pressure holdup type control systems are exemplified by U.S. Pat. Nos. 3,115,453 issued Dec. 24, 1963 to J. A. Paget et al; 3,940,310 issued Feb. 24, 1976 to L. Irion et al; and 3,980,519 issued Sept. 14, 1976 to W. E. Taft.

An inherent disadvantage of the above-described hydrostatic system is that either it prevents deliberate operation of the reactor at reduced flow, or it takes too long after pump failure, for example, for the flow to decrease from its rated or hold value to the release value. Efforts for overcoming this disadvantage by the use of bellows and gas chambers are exemplified by U.S. Pat. No. 4,167,443 issued Sept. 11, 1979 to R. C. Noyes et al and by report EPRI-NP-846 entitled "Self-Activated Shutdown System for a Commercial Size LMFBR", August 1978, by Combustion Engineering, Inc., Windsor, Conn.

While these prior systems have been effective to a certain extent, a need exists for a hydrostatic type automatic control system which allows for a deliberate reduced coolant flow operation without "scramming" the system.

Therefore, an object of this invention is to provide an automatic safety rod for nuclear reactors.

Another object of the invention is to provide a pressure actuated control rod arrangement for a self activated shutdown system.

Another object of the invention is to provide a control rod having an actuating mechanism which compensates for certain reduced coolant flow operations of the reactor.

Another object of the invention is to provide an automatic control rod for a nuclear reactor which utilizes a pressure regulating device whereby the reactor can operate under selected reduced coolant flow conditions without activation of the control rod to scram the reactor.

Other objects and advantages of the present invention will become apparent from the following description and accompanying drawings.

SUMMARY OF THE INVENTION

The above objects of the present invention are accomplished by an automatic safety or control rod which utilizes a pressure regulating mechanism having one simple moving part and no trapped gas chambers or springs. Thus, this invention provides for deliberate operation of the reactor at reduced coolant flow conditions, while providing rapid activation of the control rod upon a sudden or non-deliberate reduced flow condition.

More specifically the invention involves a hydrostatically held control or safety rod with a pressure regulating device which maintains a constant pressure differential across the seal plate over a wide range of reactor core coolant flows. The pressure regulator has a built-in damper that prevents rapid response to slow flow change. Thus, the regulator fails to maintain the pressure differential across the seal plate if the flow decreases rapidly. The pressure regulator utilizes a single moving member, a piston, which moves upward or downward by differential pressure to cover or uncover openings, thereby controlling fluid flow through the regulator and the pressure differential across the seal plate of the control rod. The regulator includes a dashpot operatively associated with the piston, which serves to prevent rapid response of the regulator to minor pressure changes.

DETAILED DESCRIPTION OF THE INVENTION

The present invention is directed to a hydrostatically held safety or control rod for a self activated safety system (SASS) of a nuclear reactor, such as a liquid metal fast breeder reactor, (LMFBR) or a gas-cooled fast reactor (GCFR). The invention utilizes a pressure regulating device which allows for deliberate reactor operation at reduced coolant flow, but provides quick control rod activation for shutdown of the reactor upon any rapid decrease in coolant flow.

Figure 1:
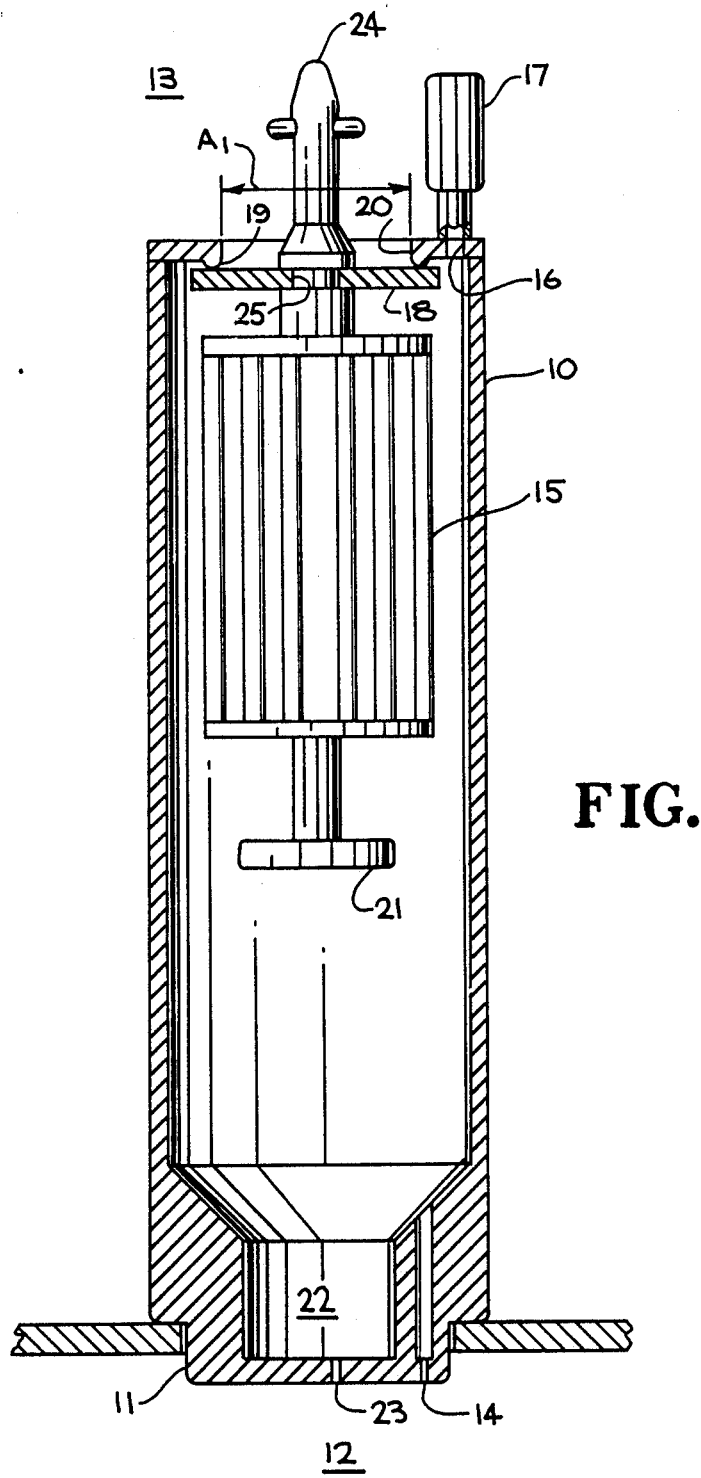
FIG. 1 is a schematic view of a self-activated shutdown system illustrating an embodiment of the invention.
Figure 2:
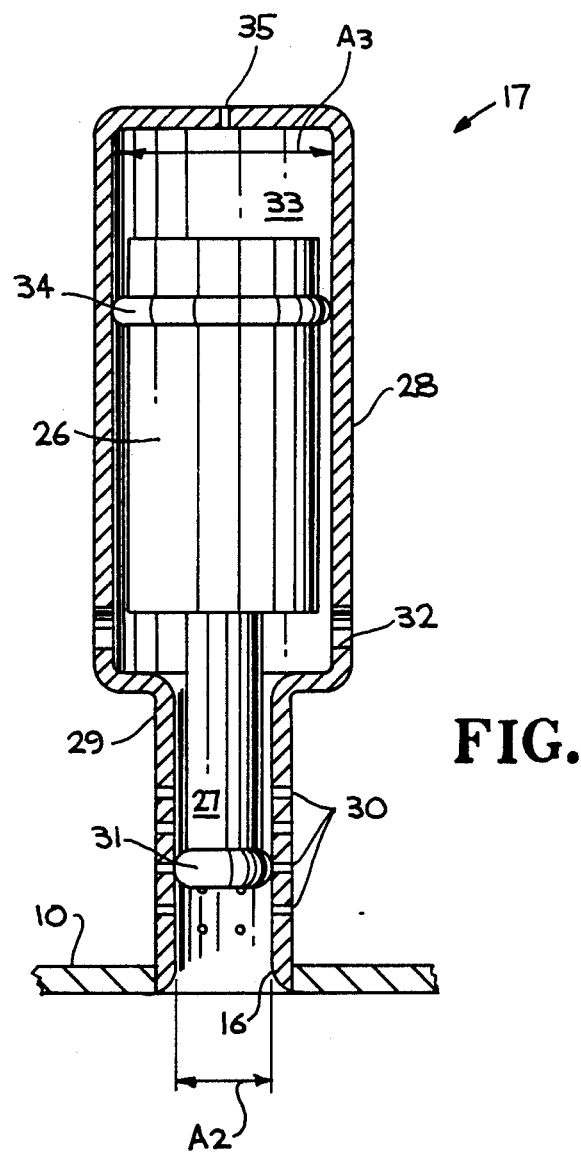
FIG. 2 is a cross-sectional view of the pressure regulating device of the FIG. 1 embodiment.

A typical design for a hydrostatically held control rod incorporating the pressure regulation approach of the invention is shown in FIG. 1 with an embodiment of the pressure regulating device shown in detail in FIG. 2. The pressure regulating device maintains a constant pressure differential across the seal plate of the control rod over a wide range of reactor core flows. This regulated pressure is only slightly more than that which is required to hold the control rod in it uppermost, or cocked, position. The pressure regulator has a built-in damper that prevents rapid response to flow changes. It, therefore, will fail to maintain the pressure differential across the seal plate if the flow decreases rapidly. The control rod will be released very soon after sudden loss of power to the main circulating pumps, for example, without waiting until the flow coasts down to a low value. If the pump flow is decreased slowly (as in a normal controlled decrease in reactor power) the pressure regulator will follow the change and prevent control rod release.

Referring now to the drawings the embodiment of FIGS. 1 and 2 includes a fuel control assembly housing or casing 10 which occupies the space of a fuel rod in the reactor core and includes a reduced diameter lower end section 11 which is exposed to a reactor core inlet plenum 12. Housing 10 is exposed to a reactor core outlet plenum 13 at its upper end. Thus, reactor core coolant normally flows upwardly from inlet plenum 12 through an opening or passage 14 in housing 10, coolant flow channels in a control rod 15, as well as around the control rod, and out through an orifice or opening 16 via a pressure regulating device 17 into outlet plenum 13. Coolant pressure within housing 10 is determined by the pressure in inlet plenum 12 and outlet plenum 13, as well as the relative flow characteristics of the orifice 16 and of the pressure regulating device 17, and other outlet leak paths including a seal surface around a seal plate 18 connected to control rod 15. The seal surface is formed by a protruding lip 19 in the upper end of housing 10 adjacent an opening 20, such that seal plate 18 bears against the lip to form a seal.

The pressure differential formed across seal plate 18 times the seal are indicated at A1 is normally slightly greater than the submerged weight of control rod 15, and, therefore, will prevent the control rod from falling. A decrease in the pressure differential will cause the control rod to release, breaking the seal at lip 19 and immediately causing the pressure within housing 10 to become nearly the same as the core outlet plenum pressure. The control rod 15 will then fall by gravity, retarded only by the flow of the displaced coolant and the relatively small flow into inlet opening 14 past the sides of the control rod.

Near the lower end of its stroke, the control rod 15 is retarded and brought to rest by a dashpot, which can consist of a relatively close fitting piston 21 attached on the lower end of the control rod entering a confined cylindrical or approximately cylindrical space 22 formed in the lower end of housing 10. The space 22 may be slightly contoured for varying flow resistance during the deceleration of the control rod. A small orifice or drain opening 23 connects space 22 with inlet plenum 12. The coolant trapped in space 22 by piston 21 is discharged through the piston clearance gap, as well as through orifice 23, thereby controlling the effectiveness of the dashpot.

After release of the control rod 15, coolant forces are far too small to raise it and thus raising of the control rod must be done with a separate lifting device that attaches to a handle 24 secured to the upper end of the control rod. After lifting the control rod upward such that seal plate 18 contacts protruding lip 19, and thus re-establishing the needed differential pressure across the seal plate, the lifting device is removed and the control rod is again retained in its ready or cocked position by coolant pressure.

In order to compensate for misalignment, the seal plate 18 is loosely mounted on the control rod handle 24 as indicated at 25. This loose mounting of the seal plate 18 introduces an additional small leakage path, but prevents gross leakage that could result from warping of the components if they were rigidly connected.

The pressure regulating device 17, shown in detail in FIG. 2 utilizes, as its only moving part, a piston 26 having a reduced diameter section 27 positioned within a housing 28 having a reduced diameter section 29 which is secured to the upper end of fuel control assembly housing 10 so as to be in fluid communication with orifice 16. Section 29 of housing 28 is provided with a plurality of rows of openings or apertures 30 positioned in spaced relationship. Piston section 27, which is positioned within housing section 29, is provided with an enlarged end 31 such that it tends to reduce fluid flow upwardly around piston section 27 while directing the flow outwardly through certain of the rows of openings 30. Housing 28 is provided in the end adjacent section 29 with a plurality of openings 32 substantially larger than the clearance area between enlarged end 31 and housing section 29.

The pressure differential across seal plate 18 of FIG. 1 (differential between the interior of housing 10 and outlet plenum 13) is controlled at a value equal to the submerged weight of the piston (26 and 27) divided by the area of its lower enlarged end 31, indicated at A2. If the differential pressure increases or decreases, the piston will move upward or downward to uncover more or fewer openings 30 until a new equilibrium is reached. The large openings 32 are provided to assure that the housing 28 adjacent housing section 29 will have the same steady-state pressure as the outlet plenum 13.

Rapid response of the pressure regulating device to pressure changes is prevented by a dashpot formed by a confined space 33 at the upper end of housing 28 above piston 26. In upward or downward motion of the piston 26, fluid (coolant) in the space 33 must flow past a guide surface or ring 34 secured to piston 26 or through a vent hole 35 in the upper end of housing 28, causing an opposing pressure across dashpot area indicated at A3. The response speed of the pressure regulating device 17 can be designed to its desired value by selecting the clearance around the piston guide surface 34 and the diameter of vent 35.

The area of the dashpot section (A3) would normally be made somewhat larger than the area of the lower end of the piston (A2) in order to achieve sufficient damping with ample clearance, and to achieve an adequate piston weight without excessive length.

By way of example characteristics of an automatic safety or control rod and operating conditions thereof, made in accordance with the invention, are set forth in the following Tables 1 and 2:

TABLE 1

| CHARACTERISTICS OF A TYPICAL AUTOMATIC SAFETY ROD | |
|---|---|
| Control Rod Weight in Air | 120 lbs |
| Control Rod Weight in Sodium | 95 lbs |
| Free Fall Acceleration (Without Resistance) | 0.79 g |
| Seal Area (A1) | 12.57 in.$^2$ |
| Seal Diameter | 4.0 in. |
| Pressure Regulator Piston Diameter (A2) | 0.75 in. |
| Pressure Regulator Dashpot Diameter (A3) | 1.75 in. |
| Pressure Regulator Piston Weight in Sodium | 3.93 lbs |
| Inlet Orifice (14) Diameter | 0.360 in. |

TABLE 2

| OPERATING CONDITION (See Footnote) | A | B | C | D |
|---|---|---|---|---|
| Reactor Flow (%) | 100.0 | 35.0 | 32.2 | 92.1 |
| Upward Hydrostatic Force (lbs) | 112.0 | 112.0 | 95.0 | 95.0 |
| Core Pressure Drop (psi) | 100.0 | 12.2 | 10.37 | 84.8 |
| Pressure Across Seal Plate (18) (psi) | 8.9 | 8.9 | 7.56 | 7.56 |
| Pressure Across Inlet Orifice (14) (psi) | 91.1 | 3.3 | 2.81 | 77.2 |
| Total Assembly Flow (ft$^3$/sec) | 0.089 | 0.017 | 0.0156 | 0.0819 |
| Seal Plate Leakage Flow (ft$^3$/sec) | 0.005 | 0.005 | 0.0046 | 0.0046 |
| Pressure Regulator Flow (ft$^3$/sec) | 0.084 | 0.012 | 0.0111 | 0.0773 |
| Area (30) Uncovered by Piston (in.$^2$) | 0.263 | 0.000 | 0.000 | 0.263 |
| Pressure Regulator Equivalent Flow Area (in.$^2$) | 0.307 | 0.044 | 0.044 | 0.307 |
| Piston Leakage Area (im.$^2$) | 0.044 | 0.044 | 0.044 | 0.044 |
| Radial Clearance Around Piston (31) (in.) | 0.019 | 0.019 | 0.019 | 0.019 |

A Normal operating conditions with reactor at full flow.
B Normal operating conditions with reactor at lowest operating flow.
C Release point if flow decreases slowly.
D Release point if flow decreases rapidly from full flow - assuming no motion in dashpot. This point will be reached in about 0.85 second after pump trip, assuming that pumps coast down at a 10-second halving time.

While not shown, the safety or control rod arrangement illustrated in FIG. 1 can include means for actuating the rod upon a signal of excessive core outlet temperature. This can be accomplished, for example, by providing a temperature-actuated valve which is located in parallel with the pressure regulator 17, and being in fluid communication with the interior of housing 10, such as by an orifice similar to orifice 16. If this temperature-actuated valve opens, the pressure differential across the seal plate will suddenly drop and the control rod will fall. Such a valve can be actuated by well-known principles such as a fusible device or a bimetallic strip. Until excessive temperature is reached, the temperature device will not effect the pressure response of the automatic control rod as described above.

Figure 3:
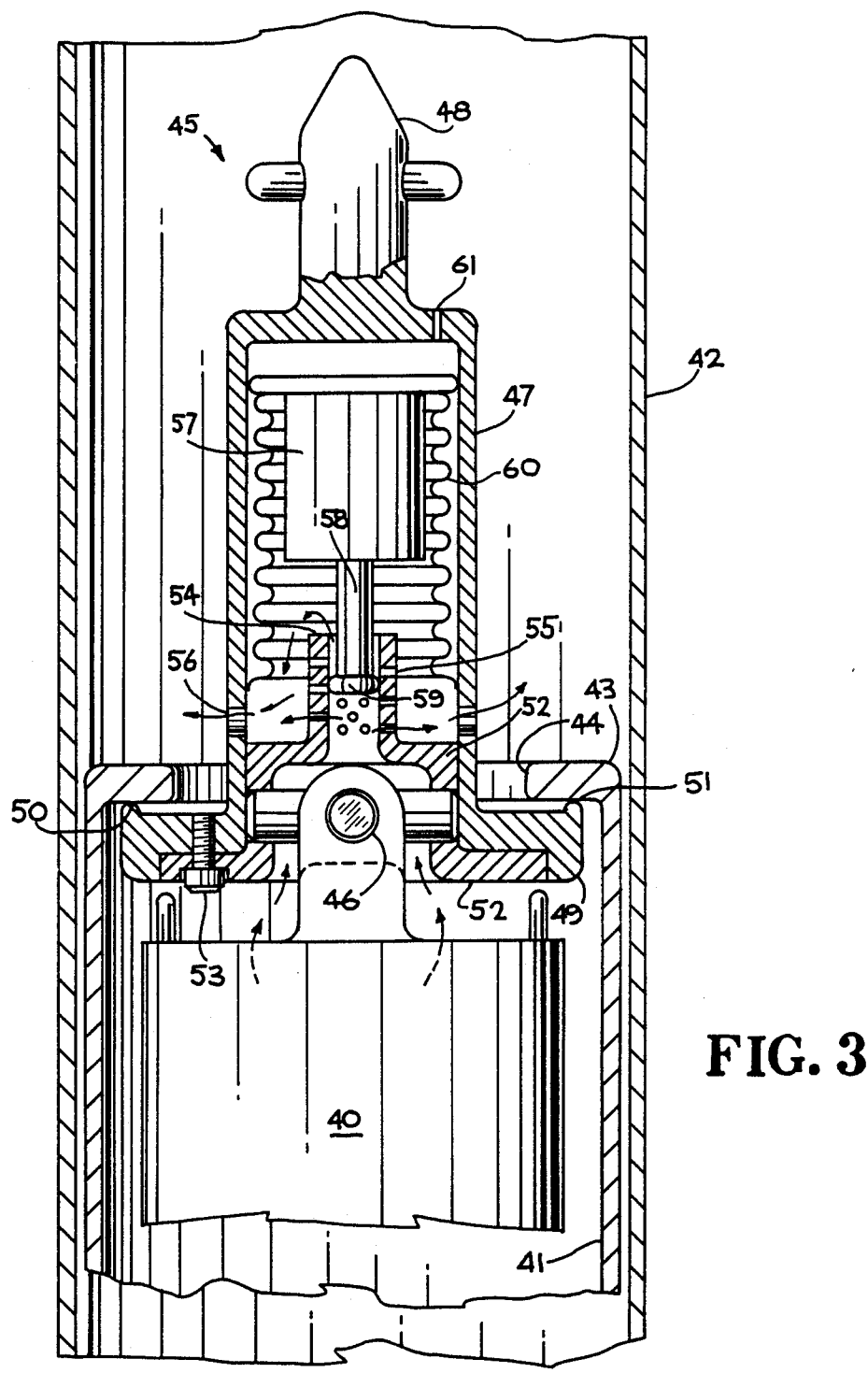
FIG. 3 is a cross-sectional view of another embodiment of the invention.

The FIG. 3 embodiment differs from the illustrated in FIGS. 1 and 2 primarily by incorporating the pressure regulator into the handle of the control rod so that is does not obstruct access to the lifting handle. The upper part of the assembly (handle and pressure regulator) is attached to the control rod by a flexible joint in order to assure an even loading of the face seal if the control rod is warped or otherwise misaligned. The dashpot of the pressure regulator has an added bellows for use in a gas environment where leakage past the piston of the pressure regulator would be excessive. The bellows would not necessarily be required in a liquid metal (sodium) environment.

Referring now to FIG. 3, a control rod 40 is positioned within a guide tube 41, which in turn is located within a channel wall or casing 42. Guide tube 41 is provided at the upper end with an inwardly extending flange 43 having an opening 44 through which a pressure regulator containing handle assembly, generally indicated at 45, extends and is coupled to the control rod 40 via a flexible joint arrangement, generally indicated at 46.

The pressure regulator containing handle assembly 45 includes a housing 47 defining a chamber therein and having a lifting handle 48 secured to or integral therewith. The lower end of housing 47 includes an outwardly extending flange 49 having an upwardly protruding annular lip 50 which cooperates with the adjacent surface of flange 43 of guide tube 41 to define a face seal indicated at 51. Flexible joint 46 is secured in housing 47 via an insert, generally indicate at 52, which is secured to flange 49 via bolts 53 (only one shown). Insert 52 includes an upwardly extending reduced diameter section 54 which is provided with a plurality of apertures 55 located in spaced rows. Housing 47 is provided with a plurality of openings 56 located adjacent apertures 55 but of a larger diameter. Thus, like in the FIG. 1 embodiment, the lower portion of the chamber of housing 47 is at substantially the same pressure as the reactor core outlet plenum.

Within housing 47 is located a piston or weight 57 containing a reduced diameter section 58 which includes an enlarged end 59. Section 58 of piston 57 cooperates with insert section 54 so as to cover or uncover various rows of apertures 55 depending on the pressure differential as described above with respect to the FIGS. 1 and 2 embodiment. A dashpot bellows 60 is positioned around piston 57 and secured at one end to the piston and at the other end to the interior of housing 47 just above openings 56. Housing 47 is provided with a leak orifice 61 adjacent lifting handle 48.

As shown by the flow arrows, coolant passes upwardly through control rod 40, flexible joint 46 and outwardly through apertures 55 in section 54 of insert 52 and through the openings 56 in housing 47, into the channel wall 42 which is in fluid communication with the upper plenum, as in FIG. 1, with a small amount of coolant passing around the enlarged end 59 of the piston. As in the FIG. 2 pressure regulator, change in differential pressure between the interior of guide tube 41 and channel 42 caused by coolant flow increase or decrease, causes the piston 57 to cover or uncover the apertures 55 so as to prevent, except under a sudden drop in pressure or flow, the activation of the control rod.

It has thus been shown that the present invention provides a significant advance in the field of hydrostatically held safety control rods, due to the utilization of the pressure regulator. As pointed out above, the invention provides for non-activation of the control rod during deliberate decreased coolant flow operation, while providing for quick insertion (activation) of the control rod upon a sudden drop in coolant flow.

While particular embodiments of the invention have been illustrated and described, modifications will become apparent to those skilled in the art, and it is intended to cover such modifications of the invention which come within the scope of the claims.

What is claimed is:

1. An automatic safety rod for use in a nuclear reactor cooled by a flow of fluid therethrough comprising:
    a casing provided with at least one opening in opposite ends,
    means containing neutron absorbing material located in said casing,
    seal means operatively connected to said means containing neutron absorbing material and constructed to be responsive to differential pressure thereacross and to substantially prevent a flow of fluid through one of said openings in said casing under normal fluid flow conditions, and
    pressure regulating means operatively positioned so as to be in fluid communication with the interior and the exterior of said casing for controlling differential pressure across said seal means, said pressure regulating means including means for preventing rapid response of said pressure regulating means except under conditions of sudden decrease of flow of fluid through said casing,
    said pressure regulating means being located within a handle assembly operatively conected to said means containing neutron absorbing material.

2. The automatic safety rod of claim 1, wherein said seal means includes a plate movably connected to said means containing neutron absorbing material.

3. The automatic safety rod of claim 1, additionally including a dashpot arrangement which includes a piston connected to said means containing neutron absorbing material and a cooperating space defined by a portion of said casing.

4. An automatic safety rod for use in a nuclear reactor cooled by a flow of fluid therethrough comprising:
    a casing provided with at least one opening in opposite ends,
    means containing neutron absorbing material located in said casing,
    seal means operatively connected to said means containing neutron absorbing material and constructed to be responsive to differential pressure thereacross and to substantially prevent a flow of fluid through one of said openings in said casing under normal fluid flow conditions, and
    pressure regulating means operatively positioned so as to be in fluid communication with the interior and the exterior of said casing for controlling differential pressure across said seal means, said pressure regulating means including means for preventing rapid response of said pressure regulating means except under conditions of sudden decrease of flow of fluid through said casing,
    said pressure regulating means including a housing and a piston movably mounted in said housing,
    said housing having two sections of different diameters, one of said housing sections being provided with a plurality of spaced rows of apertures and positioned in fluid communication with said casing, the other of said housing sections being provided with a plurality of openings,
    said piston having two sections of different diameter, one of said piston sections being provided with an enlarged end portion and upon movement covers or uncovers rows of apertures in said one housing section.

5. The automatic safety rod of claim 4, wherein said rapid response preventing means of said pressure regulating means includes a guide surface secured to the other of said two piston sections, and an aperture in said other section of said housing.

6. The automatic safety rod of claim 4, additionally including handle means operatively connected to said means containing neutron absorbing material.

7. The automatic safety rod of claim 6, wherein said seal means includes a seal plate movably mounted on said handle means, and wherein said casing includes an inwardly projecting lip on one end thereof which cooperates with said seal plate to prevent fluid flow through said one opening in said casing.

8. The automatic safety rod of claim 6, wherein said handle means comprises a handle assembly connected to said means containing neutron absorbing material by a flexible joint.

9. The automatic safety rod of claim 8, wherein said handle assembly includes a housing having a lifting handle connected at one end thereof and an outwardly extending flange at an opposite end thereof, said flexible joint being connected to said housing adjacent said outwardly extending flange, said outwardly extending flange having a protruding portion defining a lip which cooperates with said casing to define said seal means.

10. The automatic safety rod of claim 8, wherein said pressure regulating means located in said handle assembly comprises a housing having a plurality of openings therein, insert means mounted in said housing in fluid communication with said casing and provided with a plurality of rows of apertures, and a piston having a reduced diameter portion movably located in said housing, said reduced diameter portion of said piston having an enlarged end section and positioned at least partially within said insert means to cover or uncover rows of said apertures for controlling flow of fluid from said casing through said apertures and outwardly through said openings in said housing.

11. The automatic safety rod of claim 10, wherein said housing is provided with an outwardly extending flange at one end, said flange having a protruding lip which cooperates with said casing to define said seal means.

12. The automatic safety rod of claim 10, wherein said rapid response preventing means includes a dashpot bellows operatively mounted in said housing about said piston.

* * * * *